US008639395B2

(12) United States Patent
Hudson

(10) Patent No.: US 8,639,395 B2
(45) Date of Patent: Jan. 28, 2014

(54) CONDUCTIVE BODIES

(76) Inventor: Steven Martin Hudson, Sturminster Newton (GB)

(*) Notice: Subject to any disclaimer, the term of this patent is extended or adjusted under 35 U.S.C. 154(b) by 1010 days.

(21) Appl. No.: 12/514,702

(22) PCT Filed: Nov. 13, 2007

(86) PCT No.: PCT/GB2007/004317
§ 371 (c)(1),
(2), (4) Date: Feb. 24, 2010

(87) PCT Pub. No.: WO2008/059221
PCT Pub. Date: May 22, 2008

(65) Prior Publication Data
US 2010/0213318 A1    Aug. 26, 2010

(30) Foreign Application Priority Data
Nov. 13, 2006 (GB) .................... 0622568.4

(51) Int. Cl.
*G01C 23/00* (2006.01)
(52) U.S. Cl.
USPC ............... 701/3; 244/1 A; 244/135 A; 455/39
(58) Field of Classification Search
USPC .......... 244/2, 3, 135 A, 1 R, 1 A, 1 TD, 53 R, 244/121, 129.1, 133; 701/3, 4; 455/39, 455/41.1, 41.2
See application file for complete search history.

(56) References Cited

U.S. PATENT DOCUMENTS

| | | | | |
|---|---|---|---|---|
| 2,732,517 A * | 1/1956 | Alabaster | ...................... | 361/222 |
| 2,941,761 A * | 6/1960 | Cox et al. | .................. | 244/135 A |
| 3,106,663 A * | 10/1963 | Tanner | .......................... | 361/218 |
| 4,025,193 A * | 5/1977 | Pond et al. | ...................... | 356/5.1 |
| 4,290,144 A * | 9/1981 | Webb | .......................... | 455/63.1 |
| 4,451,829 A * | 5/1984 | Stuckey et al. | ................ | 343/705 |
| 4,607,313 A * | 8/1986 | Shaw et al. | .................... | 361/218 |
| 4,736,906 A * | 4/1988 | Taillet | ........................... | 244/1 A |
| 5,499,784 A * | 3/1996 | Crabere et al. | ............ | 244/135 A |
| 6,055,909 A * | 5/2000 | Sweeny | ......................... | 102/336 |
| 6,832,743 B2 * | 12/2004 | Schneider et al. | ........ | 244/135 R |
| 6,889,941 B1 * | 5/2005 | McElreath et al. | ....... | 244/135 A |
| 6,966,525 B1 * | 11/2005 | Schroeder | ................. | 244/135 A |
| 6,981,671 B1 * | 1/2006 | Baron et al. | .................. | 244/1 A |

(Continued)

FOREIGN PATENT DOCUMENTS

DE    3932550 A1    4/1991
EP    0301126 A1    2/1989

(Continued)

*Primary Examiner* — Christopher P Ellis
*Assistant Examiner* — Medhat Badawi
(74) *Attorney, Agent, or Firm* — Waddey & Patterson, P.C.; Emily A. Shouse

(57) ABSTRACT

An aircraft (10) or other conductive body having an electrical conductor which is capable of storing electrical charge, the aircraft comprising: connection means (20, 22, 24) for connecting said conductor with at least one other aircraft (10) having an electrical conductor capable of storing electrical charge so that stored charge can be transferred to and/or received from said at least one other aircraft; and control means (32, 34) for controlling transmission of charge so as to convey information to said at least one other aircraft and/or information extraction means (32, 34) for extracting information from the transmission of charge received from said at least one other aircraft.

18 Claims, 3 Drawing Sheets

(56) References Cited

U.S. PATENT DOCUMENTS

| | | | |
|---|---|---|---|
| 2002/0142716 A1* | 10/2002 | Chadwick et al. | 455/3.01 |
| 2004/0027252 A1* | 2/2004 | Hudson | 340/855.1 |
| 2004/0092296 A1* | 5/2004 | Minotani et al. | 455/575.6 |
| 2005/0187677 A1* | 8/2005 | Walker | 701/16 |
| 2005/0269456 A1* | 12/2005 | Saggio et al. | 244/135 A |
| 2006/0060709 A1* | 3/2006 | Thal | 244/135 A |
| 2006/0153109 A1* | 7/2006 | Fukumoto et al. | 370/310 |
| 2006/0206246 A1* | 9/2006 | Walker | 701/16 |
| 2006/0226293 A1* | 10/2006 | Mickley et al. | 244/135 A |
| 2008/0067290 A1* | 3/2008 | Mickley et al. | 244/135 A |
| 2010/0163679 A1* | 7/2010 | Mickley et al. | 244/135 A |
| 2010/0213318 A1* | 8/2010 | Hudson | 244/135 A |

FOREIGN PATENT DOCUMENTS

| | | |
|---|---|---|
| EP | 0600695 A2 | 6/1994 |
| EP | 1705116 A2 | 9/2006 |
| GB | 2163029 A | 2/1986 |
| WO | 9424777 | 10/1994 |
| WO | 2004036784 A1 | 4/2004 |

* cited by examiner

CONDUCTIVE BODIES

The invention relates to a conductive body in which electrostatic charge may be stored and used for conveying information to and/or receiving information from another such conductive body. More particularly, but not exclusively the invention relates to an aircraft comprising means for conveying information to and/or receiving information from another aircraft. The invention also provides a communication system for at least two conductive bodies or aircraft connected by an electrically conductive member.

Hereto, it is known to provide an aircraft with communication means such as a radio frequency, optical or acoustic transceiver to allow the aircraft to communicate information to and receive information from other aircraft or other objects. For the purposes of the invention, the term aircraft is intended to include: fixed wing aircraft, rotary blade aircraft, orbital craft, sub-orbital craft, lighter-than-air vehicles, and other craft with a communication requirement and which are spaced from the surface of the earth.

The invention is particularly but not exclusively suitable in relation to air to air refuelling of aircraft. The most common methods utilised for air to air refuelling are the so called 'hose and drogue' and 'boom' type systems as disclosed in U.S. Pat. No. 5,499,784 and U.S. Pat. No. 6,832,743. It is desirable when refuelling to convey information between the tanker and receiver aircraft. In particular, it is desirable to convey information relating to the amount of fuel delivered to the receiver aircraft particularly if the fuel transfer process is terminated prior to full transfer.

In known hose and drogue refuelling systems, each refuelling hose is retained on a drum during normal flight of the tanker and the hose can be reeled out by rotation of the drum so that the hose extends behind the tanker in the tanker's airstream. The distal end of the hose is provided with a funnel which provides air resistance to facilitate the unreeling process and engagement of the probe of the receiver aircraft with the hose. During engagement, the probe pushes against the distal end of the hose which reduces tension in the hose. The reduced tension requires compensation by timely rotation of the drum to avoid undesirable dynamic loads in the system.

During normal flight, an aircraft accumulates electrical charge on its outer surface. It is usual for a tanker aircraft and a receiver aircraft to accumulate different amounts of charge so that a potential difference is generated between the aircraft, which in some instances can be many thousands of volts. A known method of reducing this charge is to install discharge wicks to trailing edges of wing and fuselage, however, these cannot be totally relied on to reduce charge to a safe level. For safety and prior to fuel transfer, the hose or boom of the tanker is electrically conductive so that the charge on both or all aircraft can be equalized. Therefore, when the receiver aircraft engages with the tanker aircraft, charge is transferred by the connecting member so that both aircraft become the same potential. The present invention recognises that the hereto perceived problem associated with electrical charge accumulation by aircraft is of benefit in solving problems associated with the prior art discussed above.

The prior art in relation to aircraft has been discussed above, but it should be noted that the invention has applicability to other forms of transport, such as automotive land vehicles, or more generally to all conductive bodies electrostatic charge may accumulate, and be usefully incorporated into a communication system.

The present invention provides an aircraft having an electrical conductor which is capable of storing electrical charge, the aircraft comprising: connection means for connecting said conductor with at least one other aircraft having an electrical conductor capable of storing electrical charge so that stored charge can be transferred to and/or received from said at least one other aircraft; and control means for controlling transmission of charge so as to convey information to said at least one other aircraft and/or information extraction means for extracting information from the transmission of charge received from said at least one other aircraft.

The present invention also provides a communication system comprising at least two aircraft wherein said at least two aircraft are electrically connected by an elongate electrically conductive connection member so that information can be conveyed by the transmission of stored charge from one aircraft to at least one of the other aircraft or by the exchange of stored charge to and from all of said aircraft.

The present invention also provides a conductive body capable of storing electrostatic charge, and having connection means for connecting a conductor with at least one other body capable of storing electrical charge so that stored charge can be transferred to and/or received from the other body; and control means for controlling transmission of charge so as to convey information the other body and/or information extraction means for extracting information from the transmission of charge received from the other body.

The present invention also covers a communication system comprising at least two conductive bodies electrically connected by an elongate electrically conductive connection member so that information can be conveyed by the transmission of stored charge from one body to the other body or by the exchange of stored charge to and from the two bodies.

Other features of the invention are defined in the accompanying claims.

In order that the present invention may be well understood, some embodiments thereof, which are given by way of example only will now be described with reference to the accompanying drawings, in which.

Figure 1:
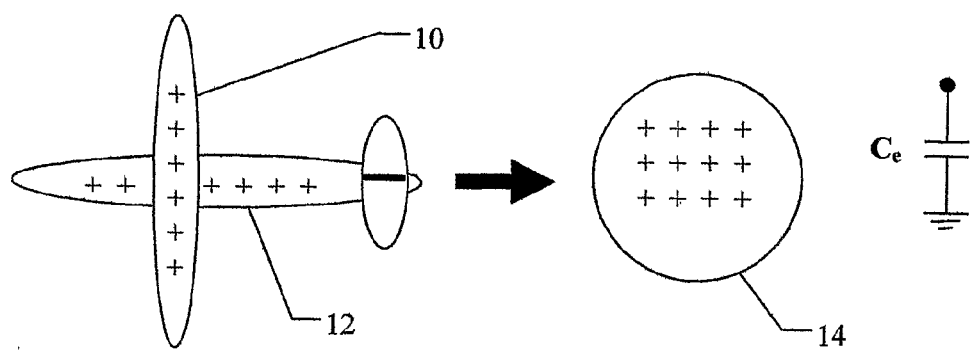
FIG. 1 is a simplified drawing of an aircraft in normal flight and a circuit diagram approximating the same.

Referring to FIG. 1, an electrically isolated conductive body, or aircraft 10 as shown, in free space has the capacity to store electric charge 12 and hence can be considered as a capacitor (see for further details p104, second edition, Fundamentals of Electricity and Magnetism by Arthur F. Kip: McGraw-Hill). For the purposes of explanation only, equivalent circuits that represent the system as far as is practicable are provided for clarification. In such circuits, as an approximation, an earth symbol is used as an equivalent to a conductive boundary at infinite distance from structure 10. $C_e$ is the capacitance of the structure to earth.

In the case of an aircraft 10, the value of it's capacitance can be shown to be of the order of 100 Pico Farads depending on size and shape. This capacitance is estimated by considering the aircraft as a conductive sphere 14 of similar surface area and using the formula:

$$C_e = 4\pi \epsilon_o r$$

Where, $C_e$ is the Capacitance in Farads, $\in_o$ is the electrostatic permittivity in free space in Farads per metre, and r is the radius of the sphere in metres Accordingly, aircraft 10 has an electrical conductor which is capable of storing electrical charge 12. This conductor may be a part of or the whole of the outer surface of the structure of the aircraft 10.

Figure 2:
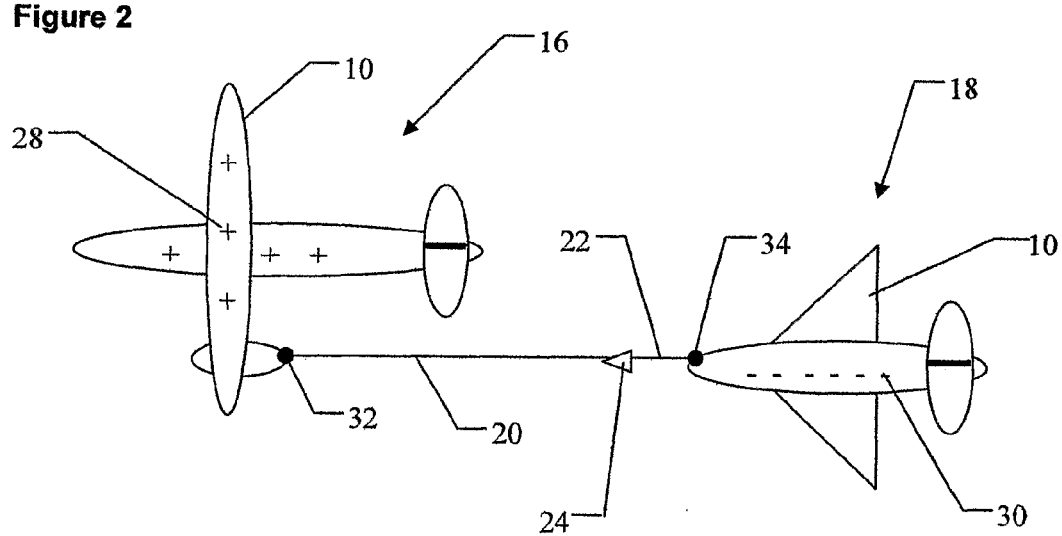
FIG. 2 is a simplified diagram showing two aircraft during a refuelling process and a circuit diagram approximating the same.
Figure 2:
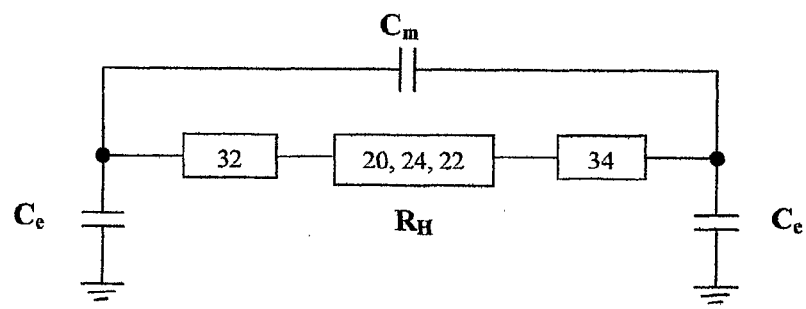

Referring to FIG. 2, two aircraft 10 are shown during a refuelling process. A tanker aircraft 16 comprises connection means which can, selectively, be placed in electrical contact with a receiver aircraft 18 for connecting the tanker aircraft to the receiver aircraft 18 so that stored charge can be transferred to and/or received from the receiver aircraft 18. The receiver aircraft 18 also comprises connection means for connecting the receiver aircraft 18 to the tanker aircraft 16 so that stored charge can be transferred to and/or received from the tanker aircraft 16. In FIG. 2, the connection means of the tanker aircraft is an elongate hollow member, or hose, 20 which is electrically conductive and can be unreeled from a drum (not shown) aboard the tanker aircraft 16. The connection means of the receiver aircraft 18 is a hollow probe 22, which is electrically conductive, extending forwardly of the receiver aircraft for engagement with an end of the hose distal from the tanker aircraft 16. The distal end of the hose 20 is provided with a drogue, or funnel, 24 for guiding engagement of the probe 22 therewith and for providing stability.

In FIG. 2, each aircraft 10 has a capacitance to earth $C_e$ (see the circuit diagram of FIG. 2) and during flight accumulates electrical charge on an electrically conductive surface thereof. In the example shown in FIG. 2, $C_e$ is not equal for both aircraft. For explanation purposes, the charge 28 on the tanker aircraft 16 is represented by a positive sign and the charge 30 on the receiver aircraft is represented by a negative sign, and this is merely an indication that charge is different to charge 30, as is not indicative of the charge on either aircraft being of any particular polarity. Accordingly, the two aircraft act as plates of a capacitor and the air therebetween is the dielectric. The mutual capacitance of the two aircraft is $C_m$ as shown in the circuit diagram.

The hose 20, drogue 24 and probe 22 have a total resistance $R_H$ and when the probe engages with the hose, the capacitor $C_m$ can discharge through resistor $R_H$ to control the share or magnitude of charge in each aircraft 16, 18.

Each aircraft 16, 18 comprises either control means 32, 34 for controlling transmission of charge so as to convey information to the other aircraft and/or information extraction means 32, 34 for extracting information from the transmission of charge received from the other aircraft.

In one arrangement of FIG. 2 for simplex transmission of information, one of the aircraft, for instance the tanker aircraft 16, comprises control means and the receiver aircraft 18 comprises information extraction means so that the transmission of stored charge from the tanker aircraft to the receiver aircraft can be controlled. The transmission of charge can be controlled in any one of a number of different ways so that information can be conveyed to the receiver aircraft. For instance and without limitation, the charge can be transmitted in timed pulses, where the duration and frequency of the pulses conveys information. On connection of resistor $R_H$ between the aircraft, charge shares between the aircraft such that the aircraft nominally have the same potential. Data communication is achieved by causing current and hence charge to flow between the aircraft in a controlled manner to encode information. This charge transfer would preferably be alternating in direction such that no net charge is transferred with the effect that an ac potential would appear between the aircraft. This ac signal could form a carrier which could be modulated using, but not limited to, pulses, frequency or amplitude type modulation schemes. Alternatively, a baseband type signalling method using a modulated voltage source could be used, build up of dc potential between the aircraft should be avoided for safety. One suitable way of avoiding a build up in dc potential is by Exclusive OR'ing the data with a clock to produce a so-called bi-phase type signal similar to that often used in frequency modulated data transmission to avoid a shift in centre frequency.

In another arrangement of FIG. 2 for duplex transmission of information, each aircraft is provided with both control means and information extraction means so that information can be conveyed in both directions.

Figure 3:
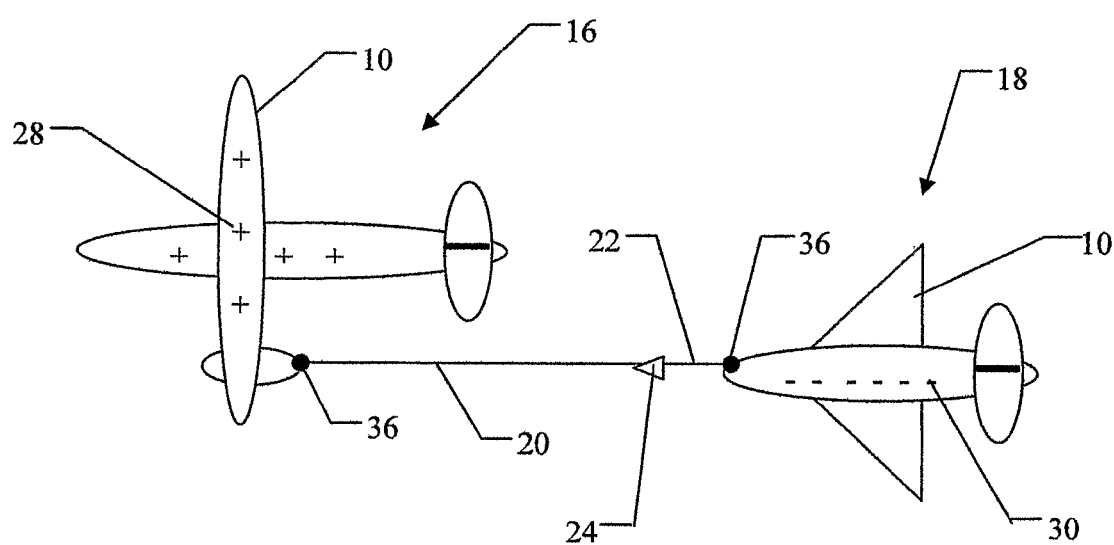
FIG. 3 is a simplified diagram showing two further aircraft during a refuelling process and a circuit diagram approximating the same.
Figure 3:
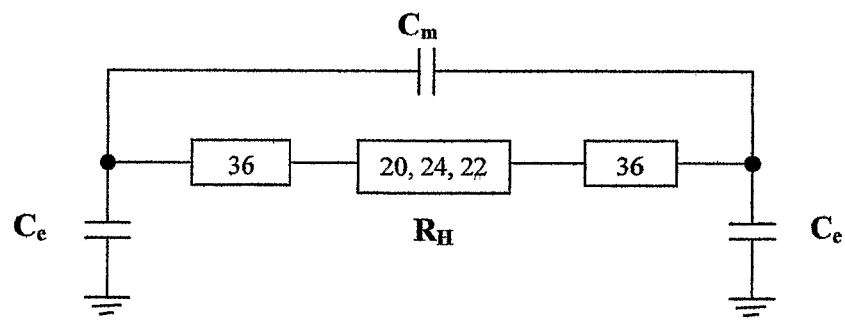

In FIG. 3, two aircraft 10 are shown which are similar to the aircraft shown in FIG. 2, and like reference numerals will be used to indicate equivalent features. In FIG. 3, a characteristic of the charge transmission from one of the aircraft to the other aircraft, using a voltage or current source means 36, is that it can be controlled to alternate in the form of a carrier wave. Inductive coupling such as current or voltage transformers are suitable for imposing an alternating form on such charge transfer. Modulation of the wave pattern can be controlled by a controlled voltage or current source such as modulator 36 to convey information. Each aircraft 10 is capable of extracting information from a modulated wave pattern with a demodulator 36. Preferably the modulator and demodulator are modems 36 configured to suit bandwidth, impedance and attenuation. The modems 36 are electrically connected between the aircraft conductor and the hose at tanker end and the probe structure and the aircraft conductor at the receiver end. Alternatively, a galvanic connection may be provided between the aircraft for safety reasons.

In the described embodiments the hose can be a relatively poor conductor, perhaps even several thousand ohms, so long as its resistance is low compared to isolation provided by the air between the two aircraft. Accordingly, the resistance of resistor $R_H$ may be selected from one of a wide range resistance values so long as $R_H$ is substantially lower that the resistance of the air path.

Although not shown in the Figures, more than two aircraft may form part of a communication system for instance if two receiver aircraft are refuelling at one tanker aircraft. In this arrangement, the transmission of charge between all aircraft can be controlled to convey information, for instance between receiver aircraft.

Figure 4:
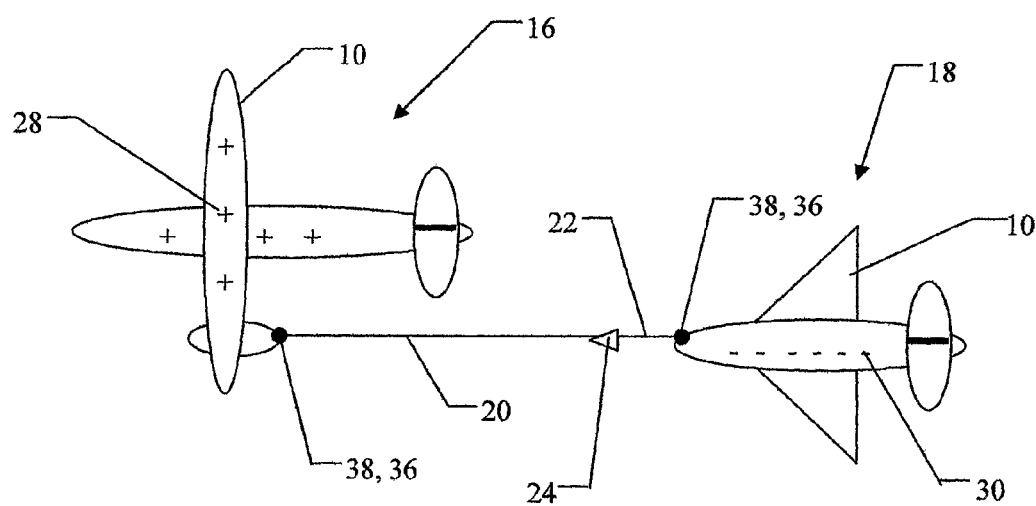
FIG. 4 is a simplified diagram showing two still further aircraft during a refuelling process and a circuit diagram approximating the same.
Figure 4:
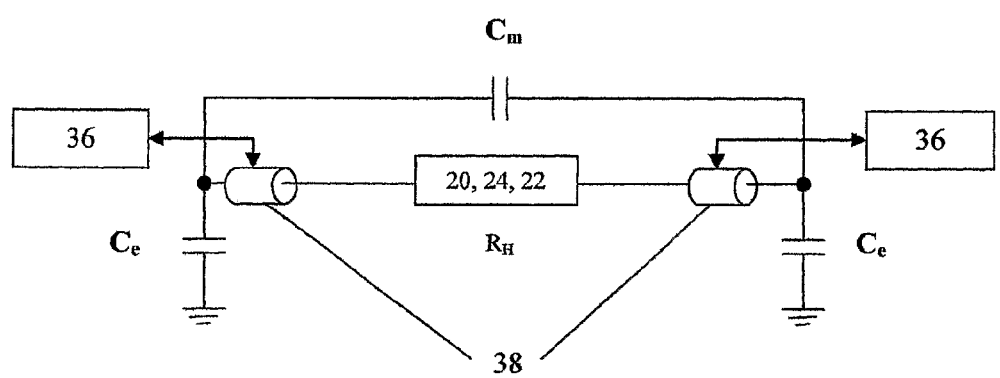

In FIG. 4, two aircraft 10 are shown which are similar to the aircraft shown in FIG. 2, and like reference numerals will be used to indicate equivalent features. In FIG. 4 charge transfer between aircraft is controlled using torroids 38 to implement a communication system whilst the aircraft 10 are connected. One advantage of the FIG. 4 arrangement is that the instant of connection and disconnection of one aircraft 10 with the other aircraft 10 can be readily detected. Connection and disconnection can be detected by monitoring the reflected secondary load on the torroids 38 due to completion of the electrical circuit created by the hose 20, probe 22 and mutual capacitance between the aircraft 10.

Connection of the aircraft could alternatively be detected by detection of the charge equalising current when the $R_H$ circuit electrically connects the two aircraft but this method is not currently preferred since there is little or no pd between the aircraft and in any case disconnection could not be detected by this method.

The application of a continuous AC voltage source to either or both of the torroid primaries produces, on connection between the aircraft 10, a step change increase in primary current due to the reflected load. Conversely, on disconnection, a step change decrease in current would occur. Upon detection of such a step change increase or decrease a signal is transmitted to a hose control unit (not shown) so that the reduced or increased tension on the hose can be compensated by timely rotation of the drum to avoid undesirable dynamic loads in the system.

Typically, a modem uses an AC signal to convey data, and is therefore suitable to be coupled with such atorroid, or a transformer, to provide galvanic isolation and match impedances between primary and secondary circuits by adjusting or selecting an appropriate turns ratio.

The arrangement of the embodiments may usefully be applied to enable remote control of devices of another aircraft upon connection of resistor $R_H$ with such aircraft, for instance, a valve of such other aircraft can be controlled or shut remotely. In this regard, the control means can convey control information to the other aircraft so that one or more devices can be controlled remotely and/or the information extraction means can extract control information from another aircraft to allow one or more devices to be contolled remotely by the other aircraft.

Additionally or alternatively, the arrangement of the embodiments may be applied to permit one aircraft to receive telemetry from another aircraft. For example, when delivering fuel it is important to avoid too much pressure being generated in the receiver aircraft which could otherwise cause structural failure. Accordingly, the prior art uses flow rate and a formula to predict pressure drop down the hose and thereby limit (must not exceed pressure ~50 psi) pressure into the receiver aircraft. Inevitably, the prior art method means that a conservative estimate of fuel transfer is made and therefore compromises performance/flow rate. In accordance with the embodiments, a pressure sensor on the drogue would provide pressure information to the tanker aircraft so that fuel can be controlled to optimise performance of the system. Accordingly, the hose comprises sensing means for sensing at least one characteristic of fuel being transferred, and wherein said sensing means can transmit said at least one characteristic (e.g. fuel flow or fuel pressure) along said hose. A further modification to the shown embodiments comprises a voltage source or detector in series with a discharge means (such as a discharge wick) for influencing charge on an aircraft and/or detecting change in potential. Such an arrangement would allow the control of charge on an aircraft for transmitting information and/or extraction of information in accordance with the change in charge on the aircraft. Several embodiments of the invention have been described with reference to the drawings but the invention is not restricted to the disclosed embodiments. The scope of the invention is defined in the accompanying claims. In particular, the scope of the invention covers all conductive bodies which are capable of storing electrical charge, and having connection means for connecting a conductor with at least one other body capable of storing electrical charge so that stored charge can be transferred to and/or received from the other body; and control means for controlling transmission of charge so as to convey information the other body and/or information extraction means for extracting information from the transmission of charge received from the other body.

The present invention also covers a communication system comprising at least two conductive bodies electrically connected by an elongate electrically conductive connection member so that information can be conveyed by the transmission of stored charge from one body to the other body or by the exchange of stored charge to and from the two bodies.

The invention has particular applicability to transportation means which are capable of storing electrostatic charge as a result of being spaced from the surface of the earth (e.g. aircraft) or insulated from earth by an insulator (e.g. a motor land vehicle insulated by rubber tyres). Such transportation means generally have a requirement for re-fuelling and on connection of a hose between a fuel vessel and the transportation means, information can be passed along the hose in either direction. For instance, when a car is re-fuelling payment information can be passed from the car to a fuel station so that when a customer completes the re-fuelling process, credit card details can be transmitted to the station and payment made, allowing a customer to continue a journey with minimal time and effort required for re-fuelling. It would also be possible to send information from a car's diagnostic system to a manufacturer via the station.

Any feature or combination of features of the embodiments described herein can be adopted in such a conductive body or transportation means.

The invention claimed is:

1. An aircraft having an electrical conductor which is capable of storing electrical charge, the aircraft comprising: connection means for connecting said conductor with at least one other aircraft having an electrical conductor capable of storing electrical charge so that stored charge can be transferred to and/or received from said at least one other aircraft; and control means for controlling transmission of charge so as to convey information to said at least one other aircraft and/or information extraction means for extracting information from the transmission of charge received from said at least one other aircraft.

2. An aircraft as claimed in claim 1, wherein the electrical conductor is an outer surface of the aircraft so that said conductor accumulates charge during normal flight.

3. An aircraft as claimed in claim 1, wherein the control means comprises a modulator for modulating the transmission of charge to convey information.

4. An aircraft as claimed in claim 1, wherein the information extraction means comprises a demodulator for demodulating transmission of charge to extract information therefrom.

5. An aircraft as claimed in claim 4, wherein said control means and said information extraction means comprise a modem.

6. An aircraft as claimed in claim 1, wherein the control means and/or the information extraction means comprises an inductive coupling for controlling the transmission of charge and/or extracting information.

7. An aircraft as claimed in claim 1, wherein the control means and/or the information extraction means comprises a voltage source for controlling the transmission of charge and/or extracting information.

8. An aircraft as claimed in claim 1, wherein the control means and/or the information extraction means comprises a current source for controlling the transmission of charge and/or extracting information.

9. An aircraft as claimed in claim 1, wherein the connection means comprises a hollow probe for receiving fuel from said at least one other aircraft.

10. An aircraft as claimed in claim 9, wherein said control means and/or said information extraction means is/are located on said probe.

11. An aircraft as claimed in claim 1, wherein the connection means comprises a hose for delivering fuel to said at least one other aircraft.

12. An aircraft as claimed in claim 11, comprising signal generation means so that on connection of said hose with another aircraft a signal is generated for indicating that said connection has been made.

13. An aircraft as claimed in claim 11, wherein said control means and/or said information extraction means is/are located on said longitudinal hollow member.

14. An aircraft as claimed in claim 1, wherein said control means can convey control information to the other aircraft so that one or more devices of another aircraft can be controlled remotely.

15. An aircraft as claimed in claim 1, wherein said information extraction means can extract control information from another aircraft to allow one or more devices to be controlled remotely by the other aircraft.

16. An aircraft as claimed in claim 11 wherein said hose comprises sensing means for sensing at least one characteristic of fuel being transferred, and wherein said sensing means can transmit said at least one characteristic along said hose.

17. An aircraft as claimed in claim 16 wherein said sensing means comprises means for sensing fuel flow or fuel pressure.

18. A communication system comprising at least two aircraft each comprising: connection means for connecting said conductor with at least one of the other aircraft having an electrical conductor capable of storing electrical charge so that stored charge can be transferred to and/or received from said at least one other aircraft; and control means for controlling transmission of charge so as to convey information to said at least one other aircraft and/or information extraction means for extracting information from the transmission of charge received from said at least one other aircraft.

* * * * *

UNITED STATES PATENT AND TRADEMARK OFFICE
CERTIFICATE OF CORRECTION

PATENT NO.       : 8,639,395 B2                                               Page 1 of 1
APPLICATION NO. : 12/514702
DATED            : January 28, 2014
INVENTOR(S)      : Steven Martin Hudson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this
Twenty-second Day of September, 2015

Michelle K. Lee
*Director of the United States Patent and Trademark Office*